Dec. 12, 1967  H. RASWORSCHEGG ET AL  3,357,820
METHOD OF AND INSTALLATION FOR THE UTILIZATION OF HOT WASTE
GASES FROM FURNACES OF METALLURGICAL WORKS
Filed Feb. 11, 1964    2 Sheets-Sheet 1

Dec. 12, 1967    H. RASWORSCHEGG ETAL    3,357,820
METHOD OF AND INSTALLATION FOR THE UTILIZATION OF HOT WASTE
GASES FROM FURNACES OF METALLURGICAL WORKS
Filed Feb. 11, 1964    2 Sheets-Sheet 2

United States Patent Office 3,357,820
Patented Dec. 12, 1967

3,357,820
METHOD OF AND INSTALLATION FOR THE UTILIZATION OF HOT WASTE GASES FROM FURNACES OF METALLURGICAL WORKS
Heinrich Rasworschegg, Demeter Markow, and Alfred Sandri, Graz, Austria, assignors to Waagner-Biro Aktiengesellschaft, Vienna, Austria, a corporation of Austria
Filed Feb. 11, 1964, Ser. No. 344,016
11 Claims. (Cl. 75—60)

The present invention relates to a method of and an installation for the utilization of hot waste gases from furnaces of metallurgical works, preferably from steel converters in a waste heat utilization apparatus.

It is an object of the present invention to provide a method of the utilization of hot waste gases from furnaces of metallurgical works, wherein the utilization of the waste gases is performed in two steps corresponding with the enthalpy (content of sensible heat) and a subsequent oxidation (heat of combustion), which two steps can overlap partly under certain circumstances and wherein in one of the mentioned steps additional heat is supplied, in order to obtain a predetermined total heat output from the installation or apparatus for the utilization of the waste heat.

With this and other objects in view which will become apparent from the following detailed description, the present invention will be clearly understood in connection with the accompanying drawings in which.

Figure 1:
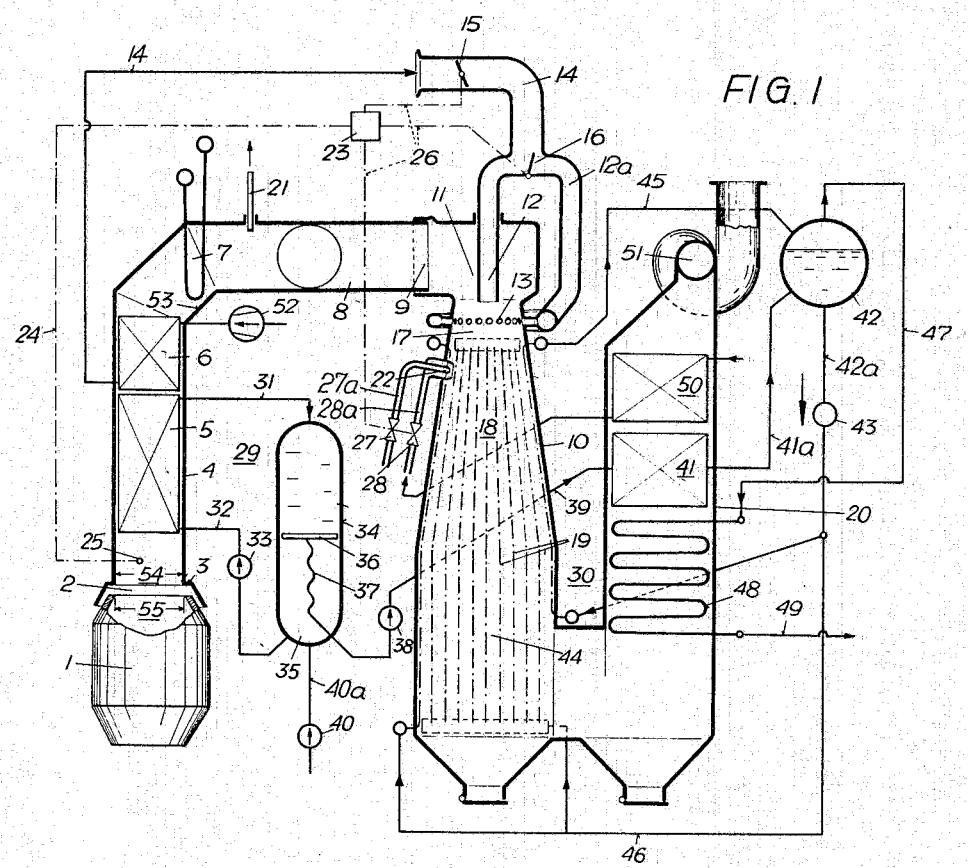
FIGURE 1 is a schematical side elevation of an installation for the utilization of waste heat according to the present invention.

Referring now to the drawings, and in particular to FIG. 1, the installation comprises a converter 1 having a mouth 2 covered by a hood 3, which is sealed tightly against the outer atmosphere, and through which mouth 2 the waste gases flow into the hood 3. A gas channel member 4 is connected with the hood 3, which gas channel member 4 receives the waste gases from the hood 3. The gas channel member 4 is equipped with radiation heating surfaces 5 and 6 and leads into a cooled slag pocket and the hot converter gases give up at least a part of their enthalpy to the radiation heating surfaces 5 and 6 and are subsequently freed from the coarse converter duct by means of the cooled slag pocket 7. A following short portion 8 of the gas channel member 4 terminates into a combustion chamber 10 by means of a rotatable joint 9. The combustion chamber 10 is formed with an injector-like portion 11, and is equipped with a feeding nozzle 12, as well as with a nozzle ring 13, the latter being adapted to feed combustion air to the entering converter waste gases. The portion of the combustion air supplied by means of the feeding nozzle 12 controls the strength of the sucking off of the converter gases such that neither secondary air can enter into the stream of waste gases nor can the converter gases escape through the narrow slot between the hood 3 and the converter 1. The remaining portion of the combustion air required for a complete combustion is supplied through the nozzle ring 13 such that simultaneously an intensive whirling of the converter waste gases with the combustion air is caused. A flap valve 15 is disposed in a feeding conduit 14 for the combustion air and controls the total quantities of the combustion air. The feeding conduit 14 is divided into the feeding nozzle 12 and into a conduit 12$^a$ feeding into the nozzle ring 13. A flap valve 16 is disposed at the mentioned dividing point of the feeding conduit 14 and serves the purpose of adjusting the ratio of the amounts of combustion air supplied through the feeding nozzle 12 and through the nozzle ring 13.

The exit of the feeding nozzle 12 and the nozzle ring 13 form jointly a mixing zone 17 and the waste gases are thus oxidized in the mixing zone 17 and enter now into the diffuser-like, enlarged portion 18 of the combustion chamber 10, the walls of which are lined with cooling pipes 19, to constitute a radiation heating surface 44. A convection flue 20 communicates with the combustion chamber 10 and the waste gases release in the combustion chamber 10 and convection flue 20 their liberated reaction heat. Under certain conditions the remainder of the initial enthalpy can also be absorbed here from the waste gases.

As can be further ascertained from FIG. 1, a slide 21 is provided in the portion 8 of the gas channel just following the slag pocket 7, which slide 21 is cooled by water by any conventional means and remains closed during the stopping periods of blowing. The combustion chamber 10 disposed therebehind, as well as the convection flue 20 are heated during this time by an additional burner 22, the heat output of which is controlled such that the total heat output of the installation reaches a predetermined, substantially constant value. A control device 23 receives a pulse from a measuring point 25 disposed in the gas channel member 4 by means of a pulse line 24, at which measuring point 25, for example, is measured the total enthalpy of the waste gases emitting from the converter 1. This total enthalpy is then approximately also a measure for the total amount of the waste gases and thus also for their reaction heat. The flap valves 15 and 16, as well as control valves 27 and 28, disposed in conduits 27$^a$ and 28$^a$ leading into the combustion chamber 10, are then controlled by means of effective lines 26. The flap valves 15 and 16 control, as set forth above, the supply of combustion air for the converter gas, and the control valves 27 and 28 control the supply of additional fuel and of the combustion air for the latter.

Relative to the medium to be heated up, the total installation is divided into substantially two cycles, namely into a secondary cycle 29 and a primary cycle 30. A heat accumulator 34 is connected with a heat exchanger 5 by means of pipings 31 and 32. In one of the pipings 31 and 32 a circulation pump 33 is disposed. Another heat exchanger 6 is provided in the gas channel chamber 4, which heat exchanger 6 is not connected with the heat exchanger 5, rather operates as a preheater for air, to which air is fed from a blower 52 to be fed by a conduit 14 to a combustion chamber 10, as will be set forth below.

The secondary cycle 29 comprises thus the already mentioned heat exchanger 5, the pipings 31 and 32, the circulating pump 33 and the heat accumulator 34. This cycle 29 serves the purpose of feeding away the sensible heat of the converter waste gases. Cold feed water is taken for this purpose from the lower portion 35 of the heat accumulator 34 and pressed through the heat exchanger 5 by means of the circulating pump 33 and fed in its warm state into the upper portion of the heat accumulator 34. An outlet float 36 is disposed in a heat accumulator 34 and a flexible conduit 37 leads from the outlet float 36 outside of the heat accumulator 34 to a feeding pump 38 and a conduit 39 leads from the feeding pump 38 into a preheater 41 for the feed water. Thus the warm feed water is then taken off by means of the outlet float 36 and the flexible conduit 37 and fed into the primary cycle 30 by means of the feed pump 38 and the warm feed conduit 39. A cold feed pump 40 is disposed in a conduit 40$^a$ and leads into the heat accumulator 34 for the supplying of cold feed water to the secondary cycle 29, that means to the heat accumulator 34. It is also possible to produce steam in the secondary cycle 29 by means of a circulating process, which steam is fed to steam accumulators and can be taken off therefrom continuously or discontinuously for smaller operation requirements or for feed-water heating.

A blower 52 is arranged adjacent the gas channel member 4 and air is fed to the radiation heating surface or heat exchanger 6 by means of the blower 52, which air is preheated on the heating surface 6 during the blowing period of the converter 1, which air serves then the oxidation of the converter waste gases in the combustion chamber 10. The radiation heating surfaces of the heat exchangers 5 and 6 can be formed by a jacket of the waste gas conduit 4, whereby the latter is formed as a double-walled member. The slag collector 7 arranged in the cycle to follow the radiation heating surfaces 5 and 6 can be cooled by the circulating medium of the secondary cycle 29. The coarse converter dust separated at the slag collector 7 falls onto an inclined surface 53 and from there in turn through the vertical portion of the waste gas channel member 4 back into the converter 1. For this reason the inner diameter 54 of the waste gas channel member 4 is slightly smaller than the inner diameter 55 of the mouth 2 of the converter 1. Solid, metal-containing compounds of the waste gases can again be returned to the metallurgical process, in particular by blowing them into the combustion chamber 10, where they are melted, and from the bottom of which they are taken off in their liquid state.

The installation is also equipped with a boiler drum 42, which communicates with the feed water heater 41 by means of a conduit 41a, and another circulation pump 43 disposed in a conduit 42a leading from the boiler drum 42. The primary cycle 30 comprises the feed-water heater 41, which is connected with the warm feed conduit 39, the boiler drum 42, and further circulating pump 43, the radiation heating surface 44 consisting of the cooling pipes 19 and lines of pipes 45 and 46, which are connected with the cooling pipes 19. The hot water supplied to the boiler drum 42 through the feed-water heater 41 has been brought to about the temperature of saturated steam in the latter. Subsequently it is taken off again from the boiler drum 42, partly evaporated in the heating surfaces 44 and the resulting mixture of steam and water is again fed to the boiler drum 42, which has a steam pillow and which now effects a separation of the two phases, that means the drum 42 acts as a degassing apparatus. The wet stream finally flows from the boiler drum 42 through a stream conduit 47 into a steam superheater 48 disposed adjacent the feed water heater 41 and from here through a hot steam conduit 49 to consumers (not shown). The heating surface 50, which is furthermore provided in the primary cycle 30, serves the purpose of preheating of the combustion air required for the additional firing during non-blowing periods. The waste gases in the convection current 20 are cooled down to the outlet temperature by means of the heating surface 50 and can now be blown out into the free atmosphere by means of the blower 51.

Figure 2:
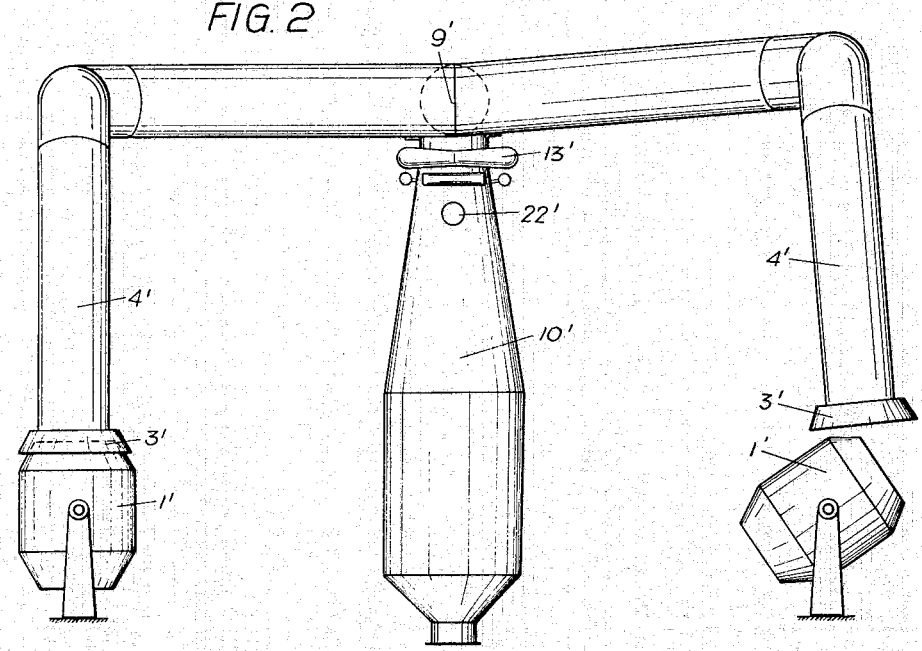
FIG. 2 is a schematical elevation of another embodiment of the installation disclosed in FIG. 1.

Referring now again to the drawings and in particular to FIG. 2, the same references are used as in FIG. 1 and are merely primed. Due to the rotary joint 9', the gas channel member 4' can be lowered with one of its hoods 3', upon the just operating converter 1', which in the case illustrated here is the left converter 1'. As can be ascertained particularly from FIG. 1, the converter waste gases are oxidized immediately upon leaving the rotary joint 9', so that false air possibly entering at this point due to leakage of the rotary joint 9', does not disturb any more.

Figure 3:
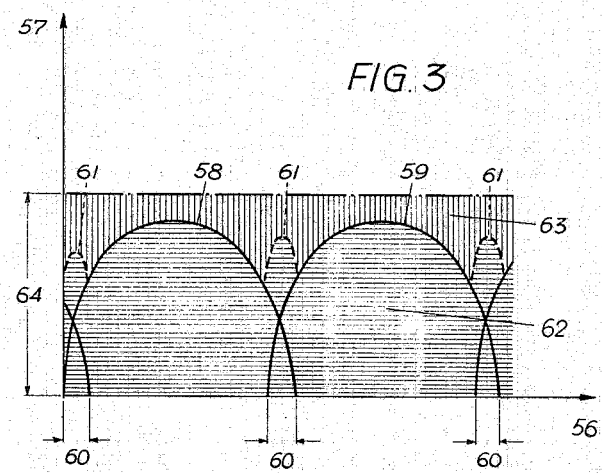
FIG. 3 is a diagram illustrating the heat content offered by two converters and an additional heater.

Referring now to FIG. 3 of the drawings, the heat sources available from two alternately operating converters and from an additional firing are explained more clearly. The time is marked on the abscissa 56. The corresponding heat souce is marked on the ordinate 57. The curve 58 represents the waste gas heat source of one of the converters, the curve 59 represents that of the other of the converters. During the periods 60 the waste gas heat sources of the two converters overlap, so that a total heat offer 61 results. The horizontally hatched areas 62 represent the amounts of heat originating from the waste heat. The vertically hatched area 63 disposed thereabove corresponds to the amount of heat originating from the additional firing. According to the present invention the amount of heat is controlled such that the variable heat output 62 is complemented to the constant heat output 64 of the installation.

Figure 4:
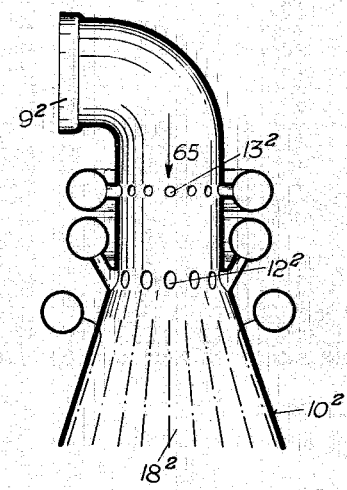
FIG. 4 is another embodiment of the injector for feeding combustion air.

Referring now to FIG. 4, the same references as used in FIG. 1 are applied, which references carry the index 2. Relative to the direction 65 of the flow of the waste gases, the nozzle ring $13^2$ is here arranged in front of the injection point. Here the injection point is formed by driving nozzles $12^2$ disposed annularly arranged in the wall of the combustion chamber $10^2$. Concerning the feeding of the amounts of combustion air through the nozzle ring $13^2$ and the driving nozzles $12^2$, the same applies as set forth above in connection with FIG. 1.

While we have disclosed several embodiments of the present invention, it is to be understood that these embodiments are given by example only and not in a limiting sense, the scope of the present invention being determined by the objects and the claims.

We claim:
1. A method of utilization of combustible hot waste gases from furnaces of metallurgical works, in particular from steel converters, in an installation for the utilization of waste heat, comprising the steps of
   first cooling the hot combustible waste gases for removing at least partially the enthalpy of said gases by passing them in indirect heat exchange relationship with water and air, respectively, to thereby preheat the water and air,
   burning the so cooled waste gases in a combustion chamber with said preheated air and without intermediate storing of said waste gases, and
   flowing the products of combustion so produced through the combustion chamber and feeding said preheated water to said combustion chamber and flowing it therethrough in indirect heat exchange relationship with said products of combustion to generate steam, whereby both the enthalpy of the waste gases and the heat of combustion thereof are utilized in the generation of the steam.

2. The method, as set forth in claim 1, wherein the step of cooling said hot combustible waste gases overlaps at least partially said step of flowing said preheated water through said combustion chamber.

3. The method, as set forth in claim 1, which includes the steps of
   supplying additional heat to said combustion chamber by means of a fuel burner, and
   controlling the flow of fuel and air to said burner by the temperature of the hot combustible waste gases prior to cooling thereof, in order to obtain the total heat output of a predetermined substantially constant value.

4. The method, as set forth in claim 3, which includes the steps of
   feeding a plurality of streams of combustion air required for the oxidation of said waste gases to the latter, and
   using at least one of said streams for the control of the amount of said waste gases to be sucked off from said furnace.

5. An installation for the utilization of the waste heat of combustible hot waste gases from furnaces of metallurgical works, in particular from steel converters, comprising
   at least one furnace, a gas conduit for hot combustible gases originating from said furnace, primary heat exchangers for the utilization of a part of the heat of said waste gases, secondary heat exchangers for the utilization of another part of said heat of said waste gases, said secondary heat exchangers being arranged in said gas conduit following said furnace, a feed conduit for an oxidation medium for said combustible waste gases, said feed conduit having an inlet into said gas conduit following said secondary heat exchangers, said primary heat exchangers being arranged in said gas conduit following said inlet of said feed conduit, additional combustion means disposed in said gas conduit between said inlet and said primary heat exchangers, and control elements for the control of the heat output of said additional combustion means, so that a constant total heat output from said installation is obtained.

6. The installation, as set forth in claim 5, wherein said gas conduit comprises an injector-like element, and said inlet of said feed conduit for said oxidation medium is formed as a driving nozzle.

7. The installation, as set forth in claim 6, comprising suction means in said gas conduit for the take-off of said waste gases from said furnace, means defining a combustion chamber for said waste gases disposed in said gas conduit, and said injector-like element being disposed at the inlet of said gas conduit into said combustion chamber.

8. The installation, as set forth in claim 7, wherein said inlet of said gas conduit into said combustion chamber is disposed on top of the latter, and the portion of said combustion chamber following said inlet is formed as a diffuser.

9. The installation, as set forth in claim 5, wherein said furnace comprises a gas discharging mouth, said gas conduit comprises a mouth portion immediately above said gas discharging mouth of said furnace, said gas conduit mouth portion has a smaller, inner diameter adjacent said gas discharging mouth of said furnace than that of the latter, said gas conduit includes an inclined portion following said gas conduit mouth portion, and a slag collector within said inclined portion of said gas conduit, so that particles separated from said waste gases by said slag collector fall back into said furnace.

10. The installation, as set forth in claim 5, comprising two furnaces, said gas conduit including a common stationary portion for said two furnaces and one displaceable portion for each of said furnaces leading into said common stationary portion, said displaceable portions being swingably connected with said common stationary portion immediately adjacent to said inlet of said feed conduit for said oxidation medium into said gas conduit.

11. The installation, as set forth in claim 10, wherein said common stationary portion comprises a combustion chamber for said waste gases, and said displaceable portions are connected with said combustion chamber.

References Cited

UNITED STATES PATENTS

| | | | |
|---|---|---|---|
| 2,831,467 | 4/1958 | Guczky | 75—60 |
| 3,134,835 | 5/1964 | Okaniwa | 75—60 |
| 3,170,017 | 2/1965 | Namy | 75—60 |
| 3,175,899 | 3/1965 | Kemmetmuler | 75—60 |
| 3,215,523 | 11/1965 | Richardson | 75—60 |

FOREIGN PATENTS 1,063,191    8/1959    Germany.

BENJAMIN HENKIN, *Primary Examiner.*